United States Patent Office 2,967,147
Patented Jan. 3, 1961

2,967,147

METHOD OF PROCESSING LUBRICATING OIL

Edward L. Cole, Glenham, N.Y., assignor to Texaco Inc., a corporation of Delaware No Drawing. Filed Jan. 24, 1958, Ser. No. 710,876

10 Claims. (Cl. 208—144)

This invention relates to improvements in the manufacture of lubricating oils. More particularly, it relates to a process for refining lubricating oil stock in which the oil is treated with hydrogen under mild hydrogenation conditions of temperature and pressure in the presence of a hydrogenation catalyst to produce a hydrogenated oil product of unexpectedly superior characteristics in respect to stability to thin-film oxidation at high temperatures.

Lubricating oils are conveniently refined by methods including the steps of distillation, solvent refining, acid treating, clay contacting and solvent dewaxing. When residual type lubricating oils are processed, an additional step of deasphalting is usually required. In the processing steps listed above, distillation is employed as a means of separating the crude oil into fractions of suitable viscosity. Solvent refining with for example furfural, sulfur dioxide or phenol, is ordinarily used primarily as a means of removing aromatic compounds and thereby improving viscosity index of the treated oil. Acid treating is employed to improve the color, stability and resistance to oxidation of lubricating oils. Clay contacting with a bentonitic clay such as fuller's earth, bauxite or Filtrol (an acid activated clay) is used to further improve the color and to remove traces of acid. Solvent dewaxing is used to lower the pour point of the oil, and deasphalting is employed to remove asphaltic bodies.

All of the characteristics noted above, that is, viscosity range, viscosity index, color, stability, resistance to oxidation, pour point and freedom from asphaltic bodies are important. The requirements of various lubricating applications differ greatly so that different oil characteristics may be limiting when manufacturing lubricating oils for different applications. Therefore to obtain a satisfactory lubricating oil, a balance of various characteristics is necessary depending upon the requirements of the intended application.

Mild hydrogenation of lubricating oil stocks is known in the prior art as a means of refining an oil for improving its viscosity index. This known hydrogenation method has an advantage over solvent refining in that the yields of treated oil are much higher for the hydrogenation process. The process of the present invention is an improvement over prior processes for refining lubricating oils by mild hydrogenation.

It is also known in the art to employ various catalysts in hydrogenation reactions including nickel, molybdenum, tungsten, vanadium, tin, zinc, chromium, iron and cobalt and particularly the oxides and sulfides of these metals. Promoters comprising oxides of other metals have been used in admixture with such catalysts, and likewise catalyst carriers such as alumina, silica gel and the like have been used.

The novel process of the present invention comprises subjecting a paraffin base residual lubricating oil fraction to refining treatment including propane deasphalting, furfural refining, methyl ethyl ketone-benzene dewaxing, clay contacting and clay filtering to produce a refined lubricating oil, thereafter contacting the resulting treated lubricating oil with hydrogen in the presence of a mild hydrogenation catalyst under mild hydrogenation conditions of temperature and pressure, for a period of time sufficient to effect reactions for the conversion of said oil to a product oil having improved stability to thin-film oxidation at high temperatures.

The present process is an improvement over known prior type processes for the treatment of lubricating oils. I have surprisingly found that under certain specified reaction conditions of temperature, pressure, space velocity and catalyst, a residual oil can be produced having superior stability to thin-film high temperature oxidation whereby it is outstanding as an aircraft engine oil.

The hydrogenating step of the process of the invention is carried out employing as catalysts a member selected from the group consisting of platinum-alumina and combined halogen, nickel sulfide-tungsten sulfide, molybdenum sulfide and cobalt molybdate. It is preferred to employ a platinum-alumina-aluminum-fluoride hydrogenation catalyst comprising 0.5 weight percent platinum, 0.8 weight percent aluminum fluoride and 98.7 weight percent alumina for the most satisfactory results. A nickel sulfide-tungsten sulfide catalyst having a composition represented by the formula $1NiS \cdot 0.75WS_2$ and a cobalt molybdate hydrogenation catalyst comprising essentially 3 percent cobalt oxide, 10 percent molybdenum oxide, 5 percent silica and 80 percent aluminum, the balance carbon and incidental impurities also have been found to be satisfactory catalysts for use in the process of the invention.

In carrying out the process of the invention, the hydrogenation step is conducted at temperatures within the range of from about 400° F. to about 700° F. but for maximum beneficial effects, the temperature range should be from about 500° F. to 600° F.

Pressures for the hydrogenation step are desirably maintained within the range of from about 200 p.s.i.g. to 5000 p.s.i.g. or more, with the most satisfactory pressure range being from about 1000 p.s.i.g. to about 3000 p.s.i.g.

Space velocities from about 0.1 volume of feed charge stock per hour per volume of catalyst to about 2.0 volumes of feed stock per hour can be employed with charge oil feed rates of from 0.2 v./v./hr. to 0.5 v./v./hr. being desired for the most satisfactory results.

The rate of consumption of hydrogen feed gas in the hydrogenation reactor is somewhat dependent on selected operating temperatures, pressures, and space velocities, with an average consumption of about 300 to 100 cubic feet of hydrogen per barrel of charge oil stock.

Following is a detailed description by way of example of methods of carrying out the novel process of the present invention.

EXAMPLE 1

A paraffin base residual lubricating oil stock was subjected to refining treatment including propane deasphalting, furfural refining, solvent dewaxing employing a mixture of methyl ethyl ketone and benzene as the solvent, clay contacting and clap filtering using fine bentonitic clay. Inspection tests on the resulting treated oil charge stock are shown in Table I below, column 1.

The thus-treated oil charge stock was then hydrogenated in a shaking autoclave for 36 hours in the presence of a platinum-aluminum fluoride catalyst comprising essentially 0.5 percent platinum, 0.83 percent aluminum fluoride and 98.67 percent alumina at a temperature of 500° F. and a pressure of 3000 p.s.i.g. Inspection tests on the hydrogenated oil product are set forth in Table I, column 2.

EXAMPLE 2

Following the procedure of Example 1, another sample of the same crude oil fraction was refined and hydrogenated in a similar manner. The conditions, catalyst, etc. were the same as those employed in Example 1 except that the autoclave was operated for 48 hours. Inspection tests on the hydrogenated oil product are shown in column 3 of Table I.

EXAMPLE 3

Following the procedure of Example 1, another sample of the same paraffin base residual lubricating oil stock was deasphalted, solvent refined and solvent dewaxed, then clay contacted and filtered in the same manner as the fraction of Example 1, thereafter the thus-treated charge stock was hydrogenated at 500° F. and 3000 p.s.i.g. in the presence of a nickel sulfide-tungsten sulfide catalyst. The autoclave was operated for 72 hours. Results of inspection tests on the product oil are set forth in Table I, column 4.

EXAMPLE 4

A charge stock blend was prepared by mixing 55 volume percent of a propane deasphalted, furfural refined, methyl ethyl ketone-benzene dewaxed, clay contacted and clay filtered paraffin base residual lubricating oil fraction obtained from a West Texas crude having properties comparable to the charge oil shown in Table I, column 1, with 45 volume percent of a different paraffin base residual lubricating oil fraction which had been propane deasphalted, furfural refined, methyl ethyl ketone benzene dewaxed, clay contacted and clay filtered. Physical properties of this latter component of the blended charge oil were as follows: API gravity 27.3°, kinematic viscosity at 210° F. 30.8, carbon residue 0.38, viscosity index 98.5.

Inspection tests on the blended charge stock are shown in Table I, column 5.

The blended charge stock was contacted with added hydrogen at a temperature of 574° F., a pressure of 1000 p.s.i.g. and a liquid space velocity of 0.35, in the presence of a cobalt molybdate catalyst on an alumina support.

Some of the physical properties of the hydrogenated product oil are shown in Table I, column 6.

EXAMPLE 5

The blended charge stock of Example 4 was also hydrogenated at 576° F., 3000 p.s.i.g. using a space velocity of 0.3 in the presence of a cobalt molybdate on alumina hydrogenation catalyst. Inspection tests obtained on the product oil are shown in column 7 of Table I.

A comparison of the data shown in Table I for the charge stock with the results of inspection tests on the hydrogenated product oil indicate that the physical properties of the product oil have not been substantially altered. The data show that hydrotreating the charge oil results in some change in kinematic viscosity, substantially no change in viscosity index, a slight improvement in color, some reduction in the residual carbon content and a slight increase in API gravity. In substance the product oils have been only slightly modified as far as physical tests are concerned. However the product oils obtained by the processing sequence of the present invention unexpectedly exhibited superior characteristics as an aircraft engine lubricating oil in respect to outstanding stability to thin-film oxidation at high temperatures.

In order to demonstrate the superiority of the experimental aircraft engine oil of the present invention over a prior type processed oil, panel coking tests were conducted on the respective oils.

PANEL COKING TEST

The procedure for conducting the panel coking test is described in the requirements of MIL-L-7808C military specification. Briefly, the panel coking test procedure of that specification comprises splashing the test fluid contained in a gravity filled reservoir onto a heated overhead aluminum panel by means of a rotating wire brush. The panel is maintained at the test temperature (600° F.) by means of a conventional automatic temperature control unit. The aluminum panel is carefully cleaned and weighed at the start of the test and reweighed after the test run. The weight of deposited coke is thereby determined and this value is taken as an indication of the oxidation stability of the test oil.

A modified panel coking test, hereinafter referred to as "modified coking test C" was employed to evaluate the stability of the experimental oil of the present invention to thin-film oxidation at high temperatures. The test procedure employed in the modified coking test C was as follows: The test oil in an amount of 120 grams was mechanically admixed with 0.240 gram of a commercial grade of carbon black having a particle size of 18 millimeters and an effective surface of 201 square meters/gram for 10 minutes. The resulting blended oil in an amount of 106 grams was then added to the oil container of a modified type of a panel coking test unit apparatus model "C" obtained from Roxana Machine Works, Roxana, Illinois. A polished weighed aluminum test panel was emplaced in the test unit and heated to a temperature of 620° F. with continuous mechanical stirring of the oil. When the panel temperature reached 620° F. stirring was continued for 5 additional minutes and the run was continued for an additional 40 minutes while maintaining the panel temperature at 620° F. During the aforementioned 40 minute test period, the opera-

*Table 1*

| Process Conditions | Col. 1 | Col. 2 | Col. 3 | Col. 4 | Col. 5 | Col. 6 | Col. 7 |
|---|---|---|---|---|---|---|---|
| Catalyst | | Platinum-Aluminum Fluoride on Alumina. | Platinum-Aluminum Fluoride on Alumina. | Nickle Sulfide-Tungsten Sulfide. | | Cobalt Molybdate on Alumina. | Cobalt Molybdate on alumina. |
| Pressure, p.s.i.g. | | 3,000 | 3,000 | 3,000 | | 1,000 | 3,000. |
| Temperature, °F. | | 500 | 500 | 500 | | 574 | 576. |
| Shaking Time, hrs. | | 36 | 48 | 72 | | | |
| Liquid Space Velocity, v./v./hr. | | | | | | 0.35 | 0.3. |
| | Charge Stock [1] | Hydrogenated Product | Hydrogenated Product | Hydrogenated Product | Blended Charge Stock [1] | Hydrogenated Product | Hydrogenated Product |
| Kinematic Viscosity: | | | | | | | |
| 100° F. | 354 | 326.6 | 323.6 | 332.3 | | 25.6 | |
| 210° F. | 24.6 | 23.3 | 23.4 | 23.6 | 27.2 | 97.5 | 25.0. |
| Viscosity Index | 97 | 97 | 98.5 | 97 | 97.5 | 5- | 98. |
| Color, ASTM | | 7+ | 3- | | 2 | 3½ | 3-. |
| Tag Robinson | 2½ | | | | | | 9½. |
| Carbon Residue, percent | 0.54 | 0.42 | 0.37 | 0.29 | 0.47 | 0.42 | 0.31. |
| Gravity, ° API | 27.3 | | | | 26.5 | 28.0 | 28.0. |
| Solid Point, ° F. | | | | | +8 | +12 | +13. |
| Sulfur Bomb, percent | | | | | | 0.07 | 0.15. |

[1] Charge Stock—The paraffin base residual lubricating oil fraction after solvent deasphalting, solvent refining, solvent dewaxing, clay contacting and clay filtering.

tion of the stirrer was controlled by a timer to permit the stirrer to operate on a repeating cycle of 2 minutes "stirrer on" and 4 minutes "stirrer off." After the 40 minute test period referred to above had elapsed, heating of the panel was discontinued and the panel was permitted to cool until it reached a temperature of 300° F. Continuous stirring of the oil was maintained throughout the cooling period. When the temperature of the panel had decreased to 300° F., the panel was removed from the unit and allowed to cool further until it attained room temperature. Thereafter the panel was rinsed with pentane, then rubbed briskly with a pentane-soaked cloth for 10 back-and-forth strokes, dried on a steam plate for three minutes, cooled (to room temperature again) and weighed. The rubbing process was repeated, the panel dried again and reweighed. The second weighing was recorded as the final panel weight. The difference between the original panel weight and the final panel weight was reported as the weight of coke deposits.

This modified panel coking test "C" is also designed as a bench test for evaluating lubricating oils under more severe conditions than those prescribed in the panel coking test itself.

Good correlation has been achieved by this bench testing method with results obtained under actual service conditions.

Results of modified coking test "C" on several of the product oils produced by the process of the present invention are given in Table II below. Comparative test results for a prior type reference oil are also shown in Table II.

Table II
MODIFIED COKING TEST "C"

| Run No. | Test Oil | Weight of Coke Deposits (milligrams) |
|---|---|---|
| 1 | Reference Oil I (Col. 1 of Table I) | 55 |
| 2 | Product Oil of Ex. 1 (Col. 2 of Table I) | 27 |
| 3 | Product Oil of Ex. 2 (Col. 3 of Table I) | 14 |
| 4 | Product Oil of Ex. 3 (Col. 4 of Table I) | 32 |

The test results indicate that the thin-film oxidation stability of the oil produced by the novel combination of processing steps of the present invention is superior to the oxidation stability of the reference oil which was refined by a prior type process. The marked reduction in deposits for the product oil of Example 2 in comparison with the amount of deposits shown for the reference oil indicates that the processing sequence for this oil is effective for the production of an aircraft engine lubricating oil having superior thin-film oxidation stability at high temperatures.

Obviously, many modifications and variations of the process of the invention may be made without departing from the spirit and scope thereof and only such limitations should be imposed as are specifically indicated in the specification and claims.

I claim:

1. A process for the treatment of a lubricating oil stock to enhance the quality thereof which consists essentially of subjecting a paraffin base residual lubricating oil fraction to refining treatment consisting of in sequence solvent deasphalting, solvent refining, solvent dewaxing, clay contacting and clay filtering, and thereafter contacting the resulting treated oil with added hydrogen in the presence of a mild hydrogenation catalyst under conditions of about 400° F. to 700° F., about 1000 to about 3000 p.s.i.g. and a space velocity of about 0.2 to 1.0 to effect reactions causing the hydrogenated product to have increased stability to thin-film oxidation at high temperatures.

2. A process for the treatment of a lubricating oil stock to enhance the quality thereof which consists essentially of subjecting a paraffin base residual lubricating oil fraction to refining treatment involving solvent deasphalting, solvent refining, solvent dewaxing, clay contacting and clay filtering to produce an intermediate product having an API gravity of about 27°, a viscosity index of about 97 and a kinematic viscosity of about 24 at 210° F., and thereafter subjecting said intermediate product in admixture with added hydrogen in the presence of a mild hydrogenation catalyst at a temperature within the range of from about 500° F. to about 600° F., a pressure within the range of from about 1000 to 3000 p.s.i.g. and a space velocity of from about 0.2 to 1.0 to convert said intermediate product to a lubricating oil of improved stability to thin-film oxidation at high temperatures.

3. A process for the treatment of a lubricating oil stock to enhance the quality thereof which consists essentially of subjecting a paraffin base residual lubricating oil fraction to refining treatment including propane deasphalting, furfural refining, methyl ethyl ketone-benzene solvent dewaxing, bentonitic clay contacting and clay filtering and thereafter contacting the resulting treated oil with added hydrogen in the presence of a mild hydrogenation catalyst under conditions of about 500° F. to 600° F., about 1000 to about 3000 p.s.i.g. and a space velocity of about 0.2 to 1.0 to effect reactions causing increased stability to thin-film oxidation at high temperatures.

4. The process as claimed in claim 3 wherein said hydrogenation catalyst comprises platinum aluminum fluoride on an alumina carrier.

5. The process as claimed in claim 3 wherein the deasphalted, solvent refined, dewaxed, clay contacted and clay filtered oil is contacted with added hydrogen at a temperature within the range of from about 500° F. to 600° F. in the presence of a nickel sulfide-tungsten sulfide hydrogenation catalyst.

6. The process as claimed in claim 3 wherein the resulting treated oil is contacted with added hydrogen in the presence of a silica-stabilized cobalt molybdate catalyst.

7. A method of processing a lubricating oil stock which consists essentially of subjecting a propane deasphalted, furfural refined, methyl ethyl ketone-benzene dewaxed, fuller's earth contacted and filtered paraffin base residual lubricating oil fraction to the influence of added hydrogen and mild hydrogenation conditions including temperatures ranging from about 500° F. to 600° F. and pressures ranging from about 1000 p.s.i.g. to about 3000 p.s.i.g. and a space velocity of from 0.2 to 1.0 volume of charge stock per hour per volume of catalyst in the presence of a cobalt molybdate catalyst for a period sufficient to produce a lubricating oil having improved resistance to thin film oxidation at high temperatures and thereafter recovering said improved lubricating oil.

8. The method as claimed in claim 7 wherein a feed rate of about 0.2 to 0.5 volume of feed stock per volume of catalyst per hour is employed.

9. The method as claimed in claim 7 wherein hydrogenation conditions are a temperature of about 575° F., a pressure of about 3000 p.s.i.g. and a feed rate of about 0.3 volume of charge stock per volume of catalyst feed per hour.

10. The method as claimed in claim 7 wherein hydrogen consumption varies from about 300 to 1000 standard cubic feet per barrel of feed stock.

References Cited in the file of this patent
UNITED STATES PATENTS

| 2,706,167 | Harper et al. | Apr. 12, 1955 |
| 2,779,713 | Cole et al. | Jan. 29, 1957 |
| 2,779,771 | Goretta | Jan. 29, 1957 |

OTHER REFERENCES

Jones: "Hydrofining Improves Low Cost Lube Quality," The Oil and Gas Journal, Nov. 1, 1954, pp. 81–84.